(12) United States Patent
Seo et al.

(10) Patent No.: US 11,750,050 B2
(45) Date of Patent: Sep. 5, 2023

(54) MOTOR AND WASHING MACHINE HAVING THE SAME

(71) Applicant: Samsung Electronics Co., Ltd., Suwon-si (KR)

(72) Inventors: Ukho Seo, Suwon-si (KR); Deokjin Kim, Suwon-si (KR); Yongwoo Nam, Suwon-si (KR); Jaewoong Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 99 days.

(21) Appl. No.: 17/191,894

(22) Filed: Mar. 4, 2021

(65) Prior Publication Data

US 2021/0281133 A1    Sep. 9, 2021

(30) Foreign Application Priority Data

Mar. 6, 2020    (KR) .......................... 10-2020-0028638

(51) Int. Cl.
*H02K 1/2786* (2022.01)
*H02K 1/30* (2006.01)
*D06F 37/30* (2020.01)

(52) U.S. Cl.
CPC ......... *H02K 1/2786* (2013.01); *D06F 37/304* (2013.01); *H02K 1/30* (2013.01)

(58) Field of Classification Search
CPC .. D06F 37/304; H02K 1/2789; H02K 1/2786; H02K 1/30; H02K 15/03; H02K 15/14; H02K 1/28; H02K 15/02; H02K 1/279

USPC ........ 310/156.57, 216.069, 216.071, 156.01, 310/156.07

See application file for complete search history.

(56) References Cited

U.S. PATENT DOCUMENTS

| | | |
|---|---|---|
| 7,919,897 B2 | 4/2011 | Tajima et al. |
| 9,136,736 B2 | 9/2015 | Hoemann |
| 10,326,325 B2 | 6/2019 | Lee et al. |

(Continued)

FOREIGN PATENT DOCUMENTS

| | | |
|---|---|---|
| EP | 3 349 332 A1 | 7/2018 |
| JP | 4678549 | 4/2011 |

(Continued)

OTHER PUBLICATIONS

Machine Translation of WO 2020203293 A1 (Year: 2020).*

(Continued)

*Primary Examiner* — Jose A Gonzalez Quinones
(74) *Attorney, Agent, or Firm* — STAAS & HALSEY LLP

(57) ABSTRACT

A washing machine includes a motor. The washing machine includes a cabinet, a tub arranged inside the cabinet, a drum rotatively arranged inside the tub, and the motor. The motor includes a stator arranged on the rear wall of the tub, and a rotor. The stator is arranged to rotate by electromagnetically interacting with the stator. The rotor includes a plurality of rotor cores alternatingly arranged with a plurality of magnets in a radial form. Each of the rotor cores includes a body, a tooth formed in the front end part of the body, a first groove formed in the upper part of the body, and a second groove formed in the lower part of the body. A partition between the first and second grooves constitutes a part of the body providing an interval between the first and second grooves.

17 Claims, 17 Drawing Sheets

(56) References Cited

U.S. PATENT DOCUMENTS

| | | | |
|---|---|---|---|
| 10,734,855 B2 | 8/2020 | Yoon et al. | |
| 2009/0108693 A1* | 4/2009 | Jun | H02K 3/02 |
| | | | 310/156.01 |
| 2013/0118213 A1* | 5/2013 | Jun | D06F 37/06 |
| | | | 310/156.01 |
| 2016/0156233 A1 | 6/2016 | Yoon et al. | |
| 2016/0308412 A1 | 10/2016 | Honjo | |
| 2017/0070107 A1* | 3/2017 | Lee | H02K 1/2786 |
| 2019/0148995 A1* | 5/2019 | Tanaka | H02K 21/04 |
| | | | 29/596 |
| 2020/0251944 A1 | 8/2020 | Watanabe | |

FOREIGN PATENT DOCUMENTS

| | | | | |
|---|---|---|---|---|
| JP | 2012-60773 A | 3/2012 | | |
| JP | 5041415 | 10/2012 | | |
| JP | 5258509 | 8/2013 | | |
| JP | 5311668 | 10/2013 | | |
| JP | 2015-61364 | 3/2015 | | |
| JP | 2016-208623 A | 12/2016 | | |
| KR | 10-2015-0009453 | 1/2015 | | |
| KR | 10-1832775 | 2/2018 | | |
| KR | 10-1846966 | 4/2018 | | |
| WO | WO-2011064834 A1 * | 6/2011 | ............ | H02K 1/148 |
| WO | 2018/158930 A1 | 9/2018 | | |
| WO | WO-2020203293 A1 * | 10/2020 | | |

OTHER PUBLICATIONS

Written Opinion of the International Searching Authority dated May 31, 2021 from International Application No. PCT/KR2021/002722.
International Search Report dated May 31, 2021 from International Application No. PCT/KR2021/002722.

* cited by examiner ized. In this regard, in a conventional rotor, a stiffener and a rib were added for preventing breakage and scatter during magnetizing and driving, and accordingly, a use amount of a plastic resin was increased, and the rotor could not help being molded in a complex form. Due to a complex form of the rotor, interference between the rotor and a magnetizing yoke of a magnetizer occurred, and the distance between the magnet of the rotor and the magnetizing yoke became far, and thus there was a problem that magnetizing efficiency was reduced.

MOTOR AND WASHING MACHINE HAVING THE SAME

CROSS-REFERENCE TO RELATED APPLICATION(S)

This application is based on and claims priority under 35 U.S.C. § 119(a) to Korean Patent Application No. 10-2020-0028638, filed on Mar. 6, 2020 in the Korean Intellectual Property Office, the disclosure of which is incorporated by reference herein in its entirety.

BACKGROUND

1. Field

The disclosure relates to a motor and a washing machine having the same, and more particularly, to a spoke type permanent magnet motor having an outer type rotor and a washing machine having the same.

2. Description of Related Art

A motor is a machine that obtains a rotatory force from electric energy, and includes a stator and a rotor. A rotor is configured to electromagnetically interact with a stator, and rotates by a force that is applied between a magnetic field and a current that flows in a coil.

A permanent magnet motor that uses a permanent magnet for generating a magnetic field can be divided into a surface mounted permanent magnet motor, an interior type permanent magnet motor, and a spoke type permanent magnet motor.

Among them, a spoke type permanent magnet motor has a high spoke concentration level in terms of constitution, and accordingly, it has advantages in that it can generate a high torque and a high output, and can minimize the motor for the same output. A spoke type permanent magnet motor can be applied to a washing machine driving motor or an electric vehicle driving motor, and a small-sized generator driving motor that require a high torque and a high output characteristic.

In general, a rotor of a spoke type permanent magnet motor includes a plurality of permanent magnets that are arranged in a radial form centered around a rotation axis, a plurality of rotor cores that are arranged among the permanent magnets and support the permanent magnets and form a passage for a magnetic flux, and a molding part that supports them.

Meanwhile, for a spoke type permanent magnet motor having a high consumption amount of electricity, various attempts for improving efficiency are being made. As an example, a study on improving efficiency by maximizing a use amount of a permanent magnet used for a spoke type permanent magnet motor, is being performed. In a spoke type permanent magnet motor, a form of a rotor core adjacent to the permanent magnet acts as an important variable related to the efficiency of the motor. A conventional form of a rotor core includes one or more opening parts in a form of completely penetrating from the upper side surface to the lower side surface in a laminating direction of the rotor core. Opening parts in such a form act as a factor that reduces efficiency of a spoke type permanent magnet motor.

Also, a rotor of a spoke type permanent magnet motor used for a washing machine, etc. generates a big force along with a fast rotating speed, and thus high mechanical rigidity

SUMMARY

The purpose of the disclosure is to provide a rotor having a rotor core in a form that can maximize efficiency of a motor and a spoke type permanent magnet motor including the same.

Another purpose of the disclosure is to provide a rotor that can increase magnetizing efficiency while maintaining mechanical rigidity of the rotor, and a spoke type permanent magnet motor including the same.

For achieving the aforementioned purpose, the disclosure provides a washing machine that includes a cabinet, a tub arranged inside the cabinet, a drum rotatively arranged inside the tub, and a motor including a stator arranged on the rear wall of the tub, and a rotor wherein the rotor is configured to rotate by electromagnetically interacting with the stator, wherein the rotor includes a plurality of rotor cores alternatingly arranged with a plurality of magnets in a radial form, and each of the rotor cores includes a body, teeth formed in the front end part of the body, a first groove formed in the upper part of the body, and a second groove which is formed in the lower part of the body and is arranged to have an interval with the first groove by a partition constituting a part of the body.

The thickness of the partition following the longitudinal direction of the body may be constituted to be different from the depths of the first and second grooves.

The partition may be formed as a plurality of partitions at intervals.

Resin introducing spaces which are opened toward the rear end part of the body may be formed between the plurality of partitions.

The first and second grooves may be symmetrically formed with each other.

The front end parts and the rear end parts of the first and second grooves may be symmetrically formed with each other. The widths of the center parts of the first and second grooves may be constituted to be different from the widths of the front end parts and the rear end parts. The first and second grooves may have the same widths in the longitudinal direction.

The front end parts and the read end parts of the first and second grooves may constitute asymmetry.

The first groove or the second groove may be connected with a slit formed on the rear end of the body.

The rotor core may further include a penetration hole penetrating from the upper part to the lower part of the body.

The rotor core may further include a third groove formed in the upper part of the body, and a fourth groove which is formed in the lower part of the body and is arranged to have an interval with the third groove by another partition constituting a part of the body.

The third and fourth grooves may be symmetrically formed with each other.

Each of the third groove and the fourth groove may be connected with the resin introducing holes formed on the side surface of the body.

The rotor may include a frame wherein the plurality of magnets and the plurality of rotor cores alternatingly arranged are fixed to the inner circumferential surface, and the frame may be integrally formed with a serration to which the plurality of magnets, the plurality of rotor cores, and a driving axis are coupled by insert molding or die casting.

A part constituting the frame may be introduced into at least one of the first groove or the second groove and may be bound with the plurality of rotor cores.

A plurality of teeth may be arranged on the outer circumference of the stator core of the stator, and an aluminum coil may be wound around the plurality of teeth.

Also, the disclosure can achieve the aforementioned purpose by providing a motor that includes a stator and a rotor wherein the rotor is configured to rotate by electromagnetically interacting with the stator, wherein the rotor includes a plurality of rotor cores and a plurality of magnets alternatingly arranged in a radial form, a serration to which a driving axis is coupled, and a circular frame integrally formed with the plurality of rotor cores, the plurality of magnets, and the serration by injection molding, and the plurality of rotor cores include a first groove and a second groove to which a resin is introduced to an upper part and a lower part of the body respectively during injection molding, and a partition which constitutes a part of the body and is formed between the first and second grooves.

The thickness of the partition following the longitudinal direction of the body may be formed to be different from the depths of the first and second grooves.

The rotor core may further include a third groove formed in the upper part of the body, and a fourth groove which is formed in the lower part of the body and is arranged to have an interval with the third groove by another partition constituting a part of the body.

According to the disclosure, a steadfast coupled structure between a rotor core and a frame is provided and reduction of the volume of the rotor core is minimized, and an effect of increasing a use amount of magnets can thereby be achieved, and thus motor efficiency can be improved.

Also, according to the disclosure, a plurality of rotor cores, a plurality of permanent magnets, and a serration delivering a motor driving force are injection molded integrally, and the structure of the rotor is thereby formed to be simple, and accordingly, not only the manufacturability can be improved, but also magnetizing efficiency can be increased when magnetizing the magnets of the rotor.

DETAILED DESCRIPTION

Figure 1:
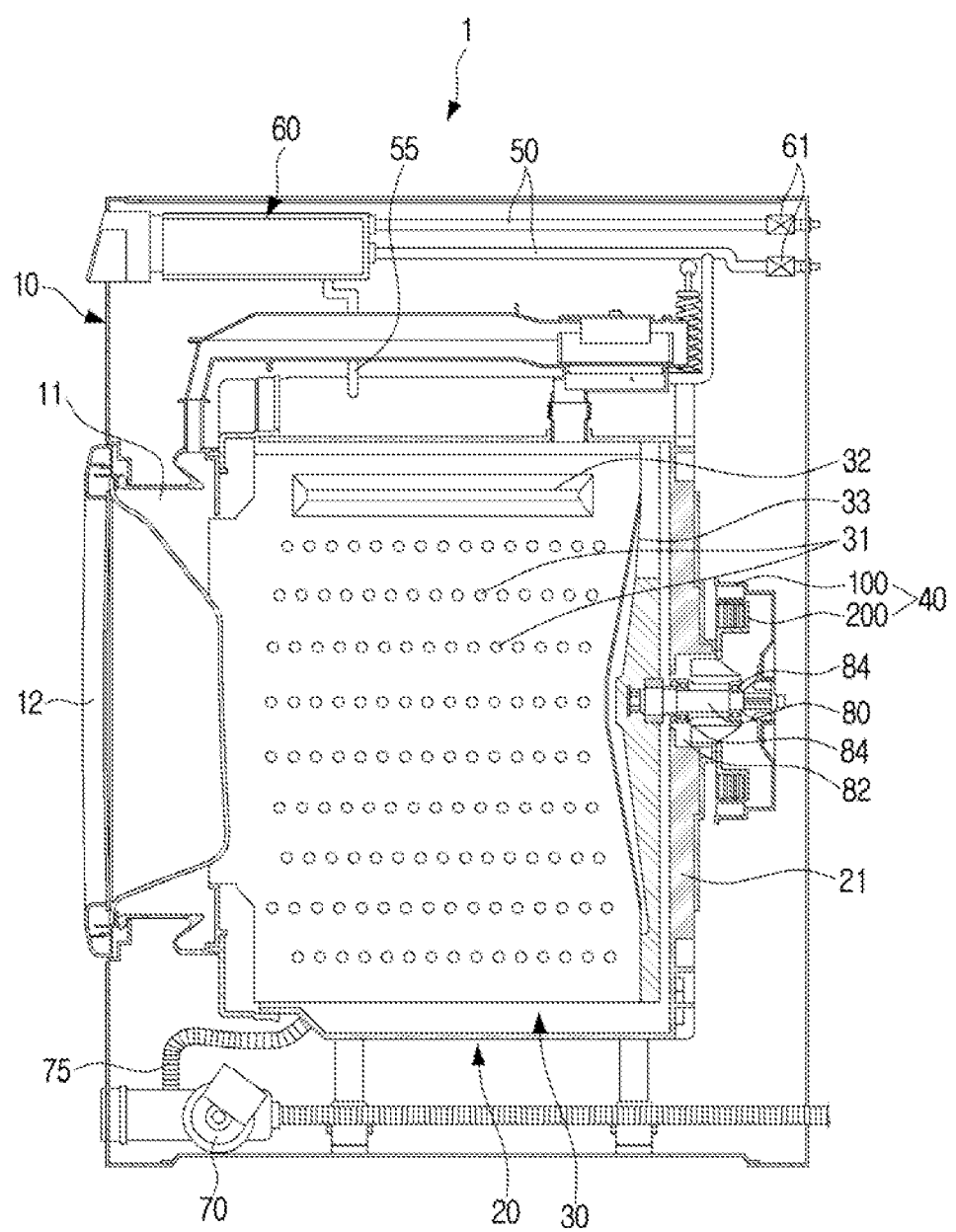
FIG. 1 is a cross-sectional diagram schematically illustrating a washing machine to which a motor is applied according to an embodiment of the disclosure.

Hereinafter, the disclosure will be described in detail through embodiments described with reference to the accompanying drawings, such that those having ordinary skill in the art to which the disclosure belongs can easily understand and carry out the disclosure. Meanwhile, in case it is determined that in describing the disclosure, detailed explanation of related known functions or components may unnecessarily confuse the gist of the embodiments, the detailed explanation will be omitted.

The terms used below are terms selected in consideration of the functions in the embodiments, and the meanings of the terms may vary according to a user, an intention of an operator, or a precedent, etc. Therefore, the meanings of the terms used in the embodiments described below will follow their definitions in case the meanings are defined specifically below, and in case there are no specific definitions, the meanings will need to be interpreted as meanings generally recognized by those having ordinary skill in the art.

In addition, the components in the aspects selectively described or the embodiments selectively described below need to be interpreted that they can be freely combined with one another unless it is obvious to those having ordinary skill in the art that they are technically contradictory as long as there is no description meaning the contrary, even if they are illustrated as a single combined component in the drawings.

The rotor that will be described below can be applied to various kinds of devices that use a motor as a power source such as a washing machine, an air conditioner, an electric vehicle, a light rail, an electric bicycle, a small-sized generator, etc., but hereinafter, explanation will be made based on an example of a washing machine for the convenience of explanation. Also, a motor applied to a washing machine includes a stator and a rotor that rotates by electromagnetically interacting with the stator. A rotor may be divided into a rotor of an outer type that is located on an outer side of a stator and a rotor of an inner type that is located on an inner side of a stator.

In a motor to which an inner type rotor is applied, as the rotor rotates on an inner side of a stator, the radius of the rotor is restricted, and thus there are disadvantages that fewer torques are generated in the same volume and usability of the inner space is reduced. In contrast, in a motor to which an outer type rotor is applied, as the rotor is provided on an outer side of a stator, there are advantages that torques can be increased in the same volume, and the inner space of the stator can be utilized for another use. An outer type rotor is a rotor of a type that changes electric energy to mechanical energy (a rotatory force) on an outer side but not an inner side of a stator and delivers the energy, and compared to a core of an inner type rotor, its core is constituted as a completely divided form, and thus there is an advantage that leakage of a magnetic flux is small.

Also, a motor to which an outer type rotor is applied can provide a low speed and a high torque compared to a motor to which an inner type rotor is applied, and thus the motor can acquire high efficiency in a product like a washing machine.

The motor according to the disclosure that will be described below is a motor for a washing machine to which an outer type rotor is applied.

Hereinafter, an embodiment of a washing machine including a motor to which an outer type rotor is applied will be described with reference to FIG. 1.

FIG. 1 is a cross-sectional diagram schematically illustrating a washing machine to which a motor is applied according to an embodiment of the disclosure.

Referring to FIG. 1, a washing machine 1 includes a cabinet 10 forming the exterior, a tub 20 arranged inside the cabinet 10, a drum 30 rotatively arranged inside the tub 20, and a motor 40 rotatively driving the drum 30.

On the front surface part of the cabinet 10, an inlet 11 is formed such that laundry can be introduced into the inside of the drum 30. The inlet 11 is opened and closed by the door 12 installed on the front surface part of the cabinet 10.

In the upper part of the tub 20, a water pipe 50 for providing washing water to the tub 20 is installed. One side of the water pipe 50 is connected to an external water source 61, and the other side of the water pipe 50 is connected to a detergent supply apparatus 60. The detergent supply apparatus 60 is connected with the tub 20 through a connection pipe 55. Water provided through the water pipe 50 is provided to the inside of the tub 20 together with the detergent via the water supply apparatus 60.

In the lower part of the tub 20, a drain pump 70 and a drain pipe 75 for discharging water inside the tub 20 to the outside of the cabinet 10 are installed.

Around the drum 30, a plurality of through-holes 31 for circulation of washing water are formed, and on the inner circumferential surface 33 of the drum 30, a plurality of lifters 32 are installed so that rising and fall of laundry can be performed when the drum 30 rotates.

The drum 30 and the motor 40 are connected through a driving axis 80. That is, the motor 40 may be a direct drive (DD) motor. The driving axis 80 delivers the rotatory force of the motor 40 to the drum 30. One end of the driving axis 80 is connected to the drum 30, and the other end of the driving axis 80 is extended to the outer side of the rear wall 21 of the tub 20.

On the rear wall 21 of the tub 20, a bearing housing 82 is installed so as to rotatively support the driving axis 80. The bearing housing 82 may be provided as an aluminum alloy, and it may be inserted into the rear wall 21 of the tub 20 when the tub 20 is insert molded. Between the bearing housing 82 and the driving axis 80, bearings 84 are installed so that the driving axis 80 can rotate smoothly.

Figure 2:
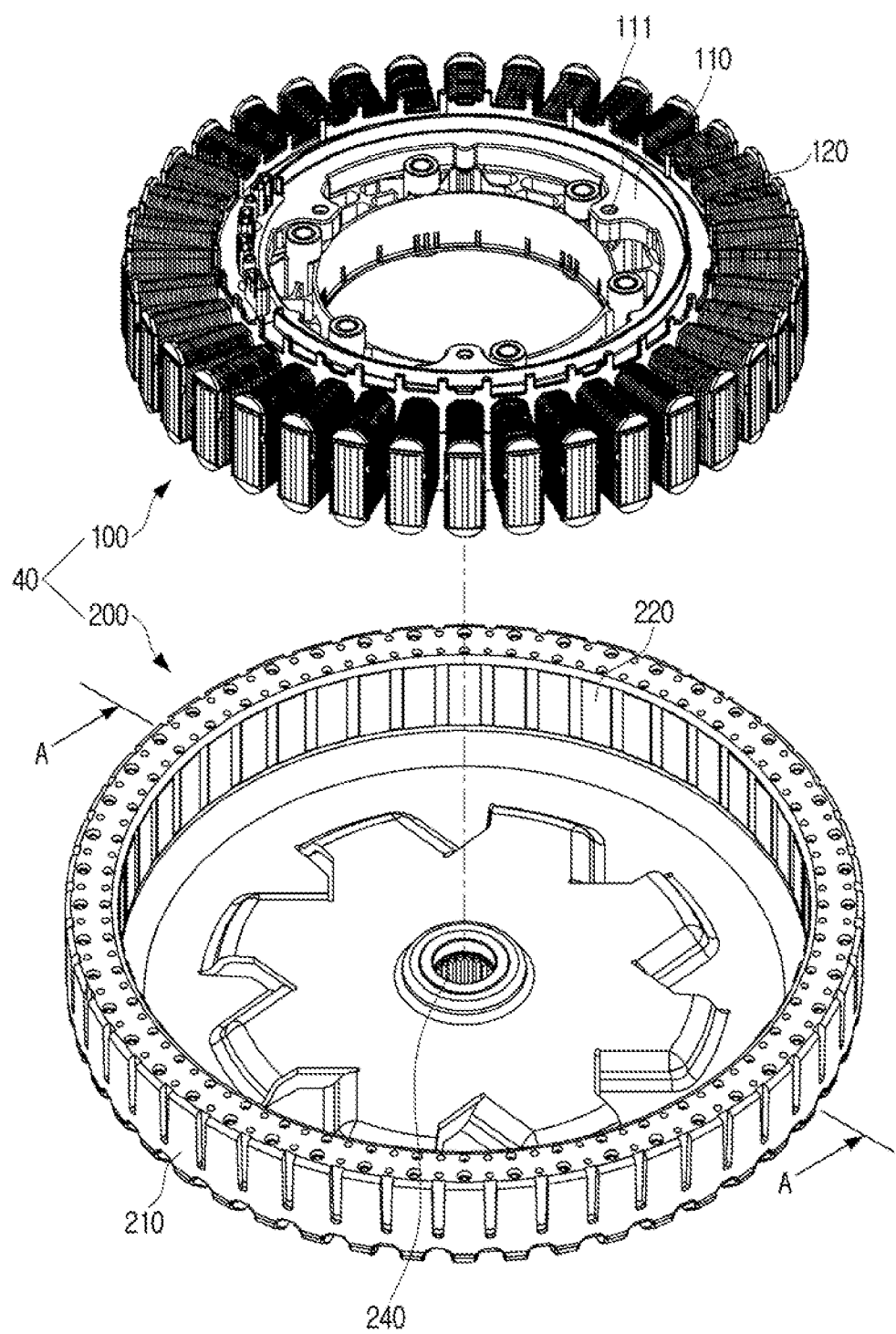
FIG. 2 is an exploded perspective view illustrating a motor according to an embodiment of the disclosure.
Figure 3:
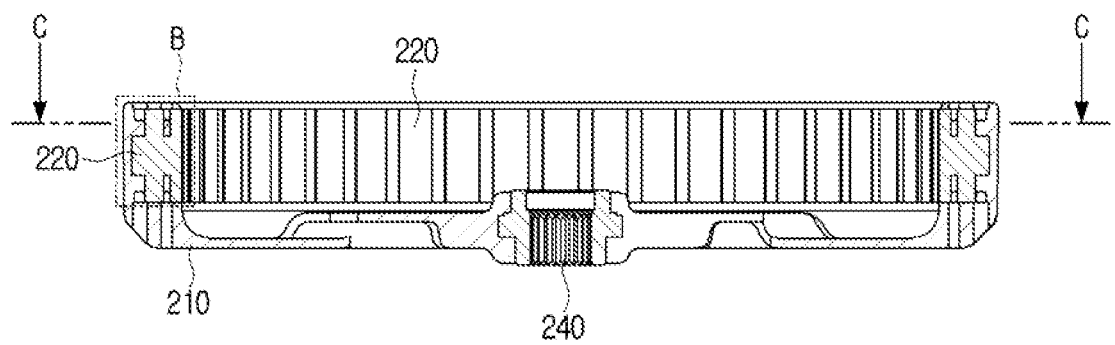
FIG. 3 is a cross-sectional diagram illustrated along the A-A line illustrated in FIG. 2.
Figure 4:
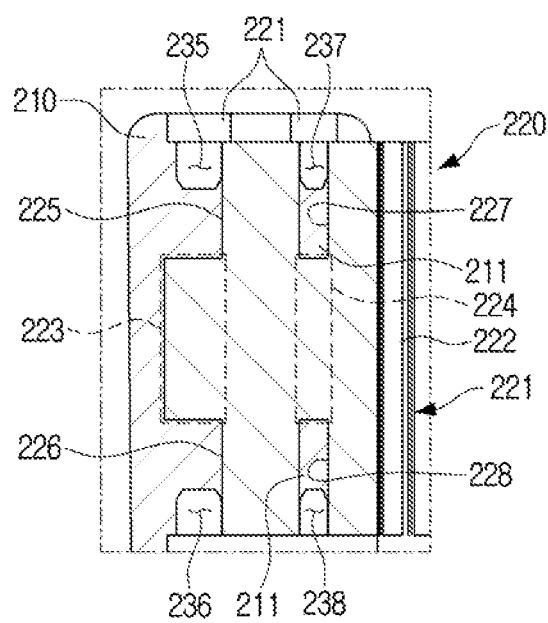
FIG. 4 is an enlarged view illustrating the B part illustrated in FIG. 3.
Figure 5:
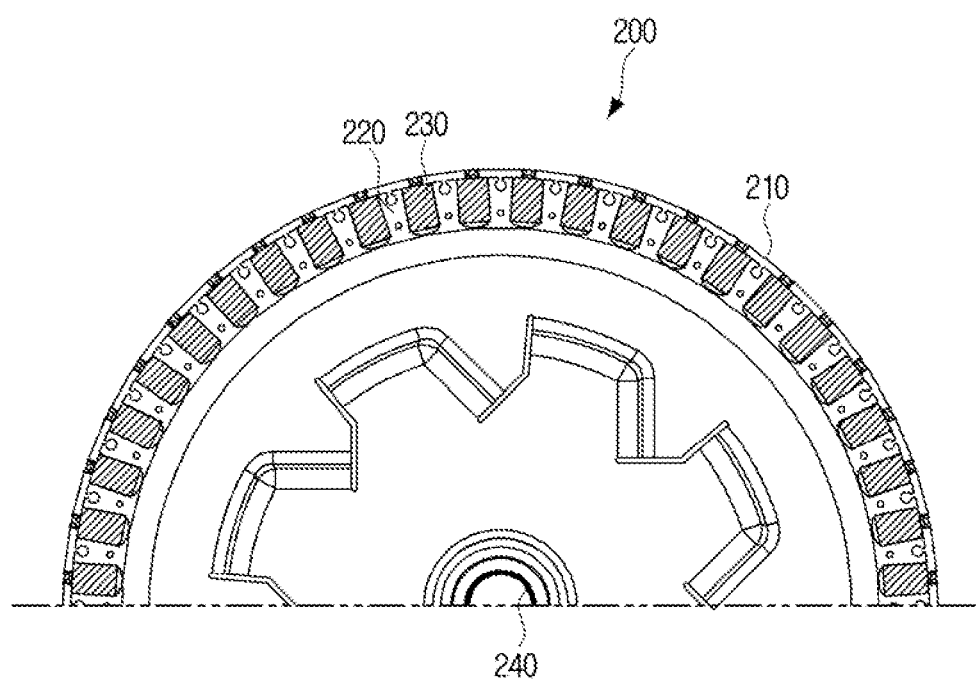
FIG. 5 is a cross-sectional diagram illustrated along the C-C line illustrated in FIG. 3.

FIG. 2 is an exploded perspective view illustrating a motor according to an embodiment of the disclosure, FIG. 3 is a cross-sectional diagram of a rotor illustrated along the A-A line illustrated in FIG. 2, FIG. 4 is an enlarged view illustrating the B part illustrated in FIG. 3, and FIG. 5 is a cross-sectional diagram of a rotor illustrated along the C-C line illustrated in FIG. 3.

The motor 40 may include a stator 100 and a rotor 200.

The stator 100 may include a stator core 110 and a coil 120.

The stator core 110 may constitute the frame of the stator 100 and maintain the shape of the stator 100, and may provide a passage wherein a magnetic field is formed such that, if one tooth is magnetized by power, another tooth adjacent to the one tooth can be inductively magnetized to different polarity from the polarity to which the another tooth adjacent to the one tooth was magnetized by power.

The stator core 110 may be formed to have a cylindrical shape, and may be formed by laminating steel plates that are press processed. Also, on the outer circumferential side of the stator core 110, a plurality of teeth may be located, and on the inner circumferential side of the stator core 110, a plurality of connection holes 111 may be provided. Other than the above, various shapes for making the shape of the stator 100 maintained and making the connection holes 111 provided may be used as examples of the shape of the stator core 110.

A plurality of teeth may be located on the outer circumference of the core 110, and divide the space between the stator 100 outside the stator core 110 and the rotor 200 into a plurality of slits along a circumferential direction. For example, the number of the teeth in the stator core 110 may be a number of 24 or more to 48 or fewer. Also, the teeth may provide a space wherein the coil 120 will be located, and it may be magnetized to one of an N pole or an S pole by a magnetic field formed by power provided to the coil 120.

The teeth may have a shape of Y, and among the outer surfaces of the teeth, a surface adjacent to the rotor 200 may have a circumlocutional surface so that an attractive force and a repulsive force with the rotor core 220 inside the rotor 200 can be generated effectively. Other than the above, various structures for providing a space wherein the coil 120 will be located and generating an attractive force and a repulsive force with the rotor core 220 effectively may be used as examples of the teeth.

The coil 120 may be provided on an insulator located on the teeth of the stator core 110, and form a magnetic field by the applied power. Through this, the coil 120 may magnetize the teeth wherein the coil 120 is located. The power supplied to the coil 120 may be in a form of three phases, or it may be in a form of a single phase.

To a method of winding the coil 120, a concentrated winding method and a distributed winding method may be applied. A concentrated winding method is a method of winding the coil 120 such that the number of the slit of one pole and one phase becomes one in the stator 100, and a distributed winding method is a method of winding the coil 120 by dividing into two or more slits in an electronic apparatus to which slits are attached. Other than the above, various methods for magnetizing the teeth effectively may be used as examples of a method of winding the coil 120.

The coil 120 may consist of copper, aluminum, or a complex material of copper and aluminum. Other than the above, various materials for effectively magnetizing the teeth may be used as examples of the material of the coil 120. A motor to which an inner type rotor is applied (hereinafter, 'an inner type motor') and a motor to which an outer type rotor is applied (hereinafter, 'an outer type motor') applied to a washing machine respectively include a stator of the same size. In this case, the rotor of the outer type motor has a bigger size than the rotor of the inner type motor, and thus the material cost can be increased more compared to the inner type motor. In the outer type motor according to the disclosure, an aluminum coil which is cheaper than a copper coil is wound around the stator, and accordingly, bigger reduction of the material cost than the increased amount of the material cost according to the increase of the size of the rotor can be induced and the unit price of the product can be reduced, and also, an appropriate torque required in a motor for a washing machine can be provided.

The connection hole 111 may be provided on the inner circumferential surface of the stator core 110, and a connection projection (not shown) of the motor seating part provided on the rear wall 21 of the tub 20 may be inserted into it. Accordingly, the stator 100 may be maintained as a coupled state to the tub 20.

The rotor 200 rotates by interacting with a magnetic field formed by the magnet 230 (FIG. 5) and the rotor core 220 provided along the inner circumferential surface and a magnetic field that is formed as power is provided to the coil 120. The rotor 200 may form a magnetic field by the magnet 230, and make an attractive force and a repulsive force operate with the magnetic field formed by the power provided to the coil 120.

Referring to FIG. 5, the rotor 200 may include a circular frame 210, a plurality of rotor cores 220 arranged in a radial form, and a plurality of magnets 230 which are arranged in a unit of one among each rotor core 220. In this case, the plurality of rotor cores 220 and the plurality of magnets 230 may be alternatingly arranged. Also, the rotor 200 may include a serration 240 (FIG. 3) which is located in the center of rotation, and to which one end of the driving axis 80 is coupled.

The frame 210 supports the rotor cores 220 and the magnets 230, and delivers the rotatory force generated by the rotor 200 to the driving axis 80 through the serration 240.

Specifically, the frame 210 may be integrally formed with the rotor cores 220, the magnets 230, and the serration 240 by insert injection molding. In this case, the thickness of the frame 210 may be determined by the centrifugal force applied to the rotor 200, the output of the motor, the rigidity of the frame material, etc. For example, the thickness of the frame 210 may be greater than or equal to 1 mm, and smaller than or equal to 5 mm.

On the frame 210, some of the rotor cores 220 may be exposed so that a surface adjacent to the stator 100 can easily interact with the magnetic field formed in the stator core 110. That is, in the outer type rotor 200, some of the rotor cores 220 on the inner circumferential surface of the frame 210 may be exposed to the outside. In case the rotor 200 is an inner type, some of the rotor cores 220 may be exposed to the outside through the outer circumferential surface of the frame 210.

On the outer circumferential surface of the frame 210 that is not adjacent to the stator 100, the rotor cores 220 and the magnets 230 may not be exposed to the outside so that a magnetic flux formed by the magnets 230 is not leaked in a direction opposing the stator 100. That is, in the outer type rotor 200, the outer circumferential surface of the frame 210 may be shut so that the rotor cores 220 and the magnets 230 are not exposed to the outside through the outer circumferential surface of the frame 210. In case the rotor 200 is an inner type, in the rotor 200, the inner circumferential surface of the frame 210 may be shut so that the rotor cores 220 and the magnets 230 are not exposed to the outside through the inner circumferential surface of the frame 210.

As the material of the frame 210, a non-magnetic material may be used. Specifically, for the frame 210, a resin may be used so that a magnetic flux is not leaked to the outer circumferential surface. For example, for the frame 210, an epoxy resin, an urethane resin, a PolyButyrene Terephthalate (PBT) resin, and a PolyEthylene Terephthalate (PET) resin may be used. Other than the above, various materials for preventing leakage of a magnetic flux may be used as examples of the material of the frame 210.

Accordingly, the rotor according to the disclosure may integrally injection mold the plurality of rotor cores, the plurality of permanent magnets, and the serration delivering a motor driving force, and thereby improve manufacturability. Also, in the rotor according to the disclosure, the structure may be simplified and the thickness may be formed to be slim. Thus, when the rotor is arranged on the magnetizer, the interval with the magnetizing yoke can be maintained to be minimum without interference, and accordingly, the magnetizing efficiency of the magnets can be maximized.

Meanwhile, as the material of the frame 210, metal having high rigidity may be used for preventing scatter of the rotor cores 220 and the magnets 230. For example, as the material constituting the frame 210, aluminum (Al) may be used. The frame 210 may be integrally formed with the rotor cores 220, the magnets 230, and the serration 240 through die casting.

Accordingly, a phenomenon that the frame 210 of the rotor 200 is heat deformed due to high heat generated when the motor is driven, and its mechanical rigidity is reduced can be prevented beforehand.

Referring to FIG. 3, the rotor cores 220 may be integrally formed with the frame 210 in a state of being arranged in a radial form along the inner circumferential surface of the frame 210 by insert injection molding.

Referring to FIG. 4, on the rotor cores 220, a plurality of filling grooves 225, 226, 227, 228 into which a resin that is a material forming the frame 210 is introduced during injection molding and are filled may be provided. If the resin 211 filled in each filling groove 225, 226, 227, 228 is cured, the frame 210 and the rotor cores 220 may constitute a steadfast coupled structure with each other. Accordingly, mechanical rigidity for scatter that may occur when the rotor 200 rotates when the motor is driven can be secured.

The rotor cores 220, the magnets 230, and the serration 240 are respectively arranged in predetermined locations in a mold before injection molding of the frame 210. During injection molding, the rotor cores 220 may be supported by a plurality of support pins (not shown) provided inside the mold. In this case, the plurality of support pins are respectively inserted into the plurality of filling grooves 225, 226, 227, 228 provided on the rotor cores 220.

While the rotor cores 220 are supported by the plurality of support pins, injection molding is performed. Accordingly, in parts occupied by the plurality of support pins as in FIG. 4, spaces 235, 236, 237, 238 may be formed. The plurality of filling grooves 225, 226, 227, 228 provided on the rotor cores 220 provide a structure for coupling between the frame 210 and the rotor cores 220, and provide a support structure that make the support pins support the rotor cores 220 during injection molding.

The magnets 230 may be magnetized by the magnetizer (not shown) after injection molding of the frame 210 is performed. For example, after the rotor 200 is located inside the magnetizer (not shown), a process of magnetizing the rotor cores 220 is performed. In this case, in case the capacity of the magnets 230 provided on the rotor 200 is small, magnetization is performed only on one side of the rotor 200, and in case the capacity of the magnets 230 is big, magnetization is performed on both sides of the rotor 200. The magnets 230 may be magnetized while having polarity according to the direction of the magnetizing magnetic flux.

Hereinafter, a rotor core according to an embodiment of the disclosure will be described in detail with reference to the drawings.

Figure 6:
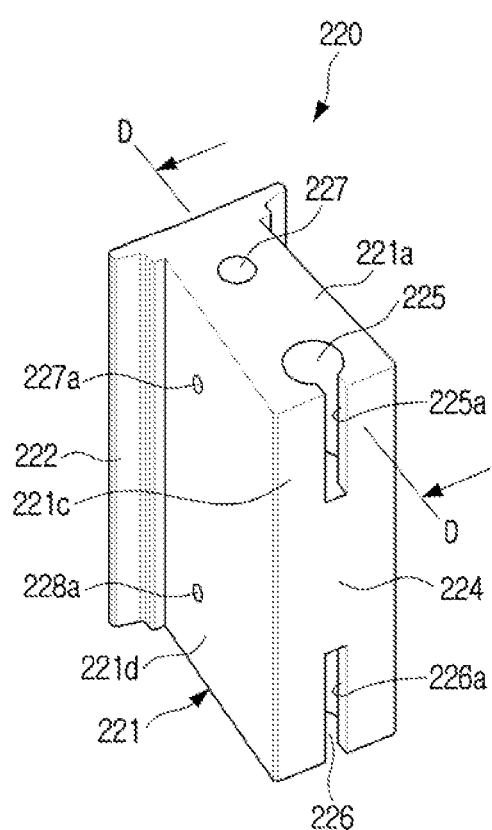
FIG. 6 is a perspective view illustrating a rotor core of a motor according to an embodiment of the disclosure.
Figure 7:
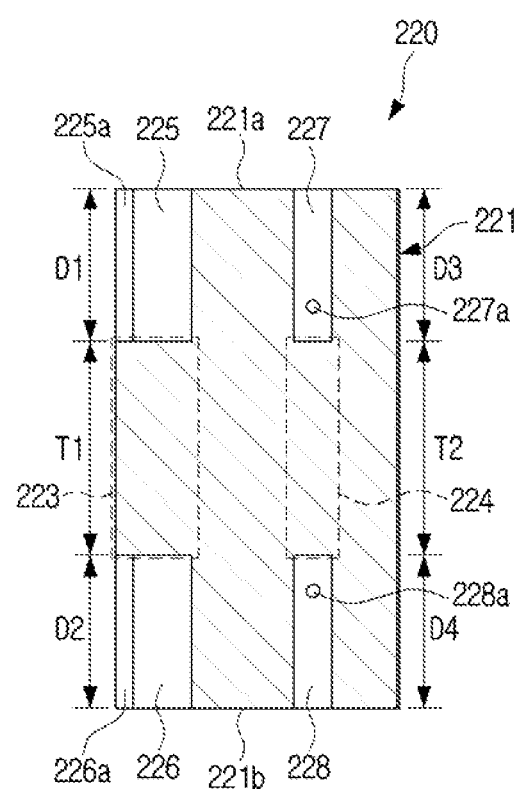
FIG. 7 is a cross-sectional diagram illustrated along the D-D line illustrated in FIG. 6.

FIG. 6 is a perspective view illustrating a rotor core according to an embodiment of the disclosure, and FIG. 7 is a cross-sectional diagram illustrated along the D-D line illustrated in FIG. 6.

Referring to FIG. 6, the rotor core 220 may include a body 221 and a tooth 222 projectingly formed on the front end part.

The rotor core 220 may be arranged on the frame 210 so that there is a specific gap from the outer circumferential surface of the stator 100, such that the tooth 222 is not interfered by the outer circumferential surface of the stator 100 during rotation.

On the rotor core 220, a first filling groove 225 and a second filling groove 226 into which a resin is filled during injection molding may be provided, so as to be coupled with the frame 210. Such first and second filling grooves 225, 226 are arranged to have an interval defined by a first partition 223 corresponding to a part of the body 221.

Accordingly, the rotor core 220 according to the disclosure has more volume as much as the volume corresponding to the partition 223 compared to a conventional rotor core having an opening part that completely penetrates the upper and lower surfaces. Accordingly, the rotor core 220 according to the disclosure may minimize reduction of the volume and achieve an effect of increasing the use amount of the magnets 230, and this may act as a factor improving the efficiency of the motor.

Hereinafter, the first and second filling grooves 225, 226 and the partition 223 will be described in detail.

Referring to FIG. 6, the first filling groove 225 may be formed in the upper part of the body 221, and the second filling groove 226 may be formed in the lower part of the body 221. The locations of the first and second filling grooves 225, 226 are in consideration of improving the fixation force as the upper side and the lower side of the rotor core 220 are simultaneously fixed to the frame 210.

Referring to FIG. 7, the first filling groove 225 may be formed into the inner side of the body 221 as much as the first depth D1 toward the lower surface 221b from the upper surface 221a of the body 221.

The first filling groove 225 may be formed in a location adjacent to the rear surface 221c of the body 221. In this case, the first filling groove 225 is connected with the first slit 225a that is formed along the longitudinal direction of the body 221 in the rear end part of the body 221. In FIG. 6, the reference numeral 226a refers to the second slit.

Accordingly, the inside of the first filling groove 225 may be opened toward the rear surface 221c side of the body 221 by the first slit 225a. The first slit 225a provides a passage through which a resin can be introduced into the inside of the first filling groove 225 during injection molding while the support pins of the mold are inserted into the first filling groove 225.

The first slit 225a may have a length in a vertical direction corresponding to the first depth D1 of the first filling groove 225, and its width in a horizontal direction may be formed to be smaller than the diameter of the first filling groove 225. Preferably, the width of the first slit 225a is sufficient if a resin can be filled inside the first filling groove 225 smoothly.

The second filling groove 226 may be formed into the inner side of the body 221 as much as the second depth D2 toward the upper surface 221a from the lower surface 221b of the body 221. For example, the second filling groove 226 may be formed in the lower part of the body 221, and may be symmetrically arranged with respect to the first filling groove 225. In this case, the second filling groove 226 may be distanced from the first filling groove 225 by a specific interval by the first partition 223. Specifically, the first and second filling grooves 225, 226 may be distanced by a distance corresponding to the thickness T1 of the first partition 223 (FIG. 7).

It is preferable that the first and second depths D1, D2 of the first and second filling grooves 225, 226 are set in consideration of both a coupling force between the frame 210 and the rotor core 220 and an effect of increasing the use amount of the magnets by the rotor core 220.

For example, it is preferable that the first and second depths D1, D2 of the first and second filling grooves 225, 226 are formed to be bigger than the thickness T1 of the first partition 223. Also, in case an additional coupled structure between the frame 210 and the rotor core 220 (the third and fourth filling grooves 227, 228 described below) is provided as the rotor core 220 of the disclosure, it is possible that the thickness T1 of the first partition 223 is formed to be the same as or smaller than the first and second depths D1, D2 of the first and second filling grooves 225, 226.

In FIG. 7, the first and second depths D1, D2 of the first and second filling grooves 225, 226 are illustrated to be approximately similar, but the depths are not limited thereto, and may be formed to be different from each other. For example, considering the height of the rotor core 220 or the coupled structure with the frame 210, etc., the depth D1 of the first filling groove 225 may be formed to be bigger than the depth D2 of the second filling groove 226 or vice versa. In this case, it is preferable that the thickness T1 of the first partition 223 is formed to be bigger than approximately (D1+D2)/2.

The rotor core 220 may further include a third filling groove 227 and a fourth filling groove 228. In the third and fourth filling grooves 227, 228, a resin may be filled during injection molding of the frame 210, like the first and second filling grooves 225, 226.

The third and fourth filling grooves 227, 228 are respectively inserted into the support pins of the mold during injection molding. In this case, the inlets of the third and fourth filling grooves 227, 228 may be shut by the support pins. Accordingly, on one side surface 221d of the body 221, resin introducing holes 227a, 228a respectively connected with the third and fourth filling grooves 227, 228 may be formed, so that a resin can be introduced into the third and fourth filling grooves 227, 228.

Referring to FIG. 7, the third filling groove 227 may be formed into the inner side of the body 221 as much as the third depth D3 toward the lower surface 221b from the upper surface 221a of the body 221, and the fourth filling groove 228 may be formed into the inner side of the body 221 as much as the fourth depth D4 toward the upper surface 221a from the lower surface 221b of the body 221.

The third and fourth filling grooves 227, 228 may be distanced by a distance corresponding to the thickness T2 of the second partition 224. The second partition 224 is a part constituting the body 221, and it is preferable that the third and fourth depths D3, D4 of the third and fourth filling grooves 227, 228 are set in consideration of both a coupling force between the frame 210 and the rotor core 220 and an effect of increasing the use amount of the magnets by the rotor core 220. For example, considering the height of the rotor core 220 or the coupled structure with the frame 210, etc., the third depth D3 of the third filling groove 227 may be formed to be bigger than the fourth depth D4 of the fourth filling groove 228 or vice versa.

The third and fourth filling grooves 227, 228 may be arranged to be more adjacent to the front end part of the body 221 compared to the first and second filling grooves 225, 226. The locations of the first to fourth filling grooves 225, 226, 227, 228 are not limited to the locations illustrated in FIG. 7, and they may be set variously in consideration of the size, the thickness, the coupled point with the frame 210, etc. of the rotor core.

The sizes of the third and fourth filling grooves 227, 228 may be formed to be smaller than the sizes of the first and second filling grooves 225, 226. It is preferable that the sizes of the first to fourth filling grooves 225, 226, 227, 228 are in consideration of minimizing reduction of the volume of the rotor core 220.

Meanwhile, in the rotor core 220, a plurality of thin films consisting of a metal material may be formed to be laminated to a specific height. Accordingly, the plurality of thin films for forming the rotor core 220 are manufactured to respectively correspond to the shapes of the first and fourth filling grooves 225, 226, 227, 228 formed on the rotor core 220, the first partition 223 provided between the first and second filling grooves 225, 226, and the second partition 224 provided between the third and fourth filling grooves 227, 228, according to the locations where they are laminated.

Hereinafter, various shapes of a rotor core according to other embodiments of the disclosure will be described with reference to the drawings.

FIG. 8 to FIG. 15B are diagrams illustrating various embodiments of a rotor core.

Figure 8:
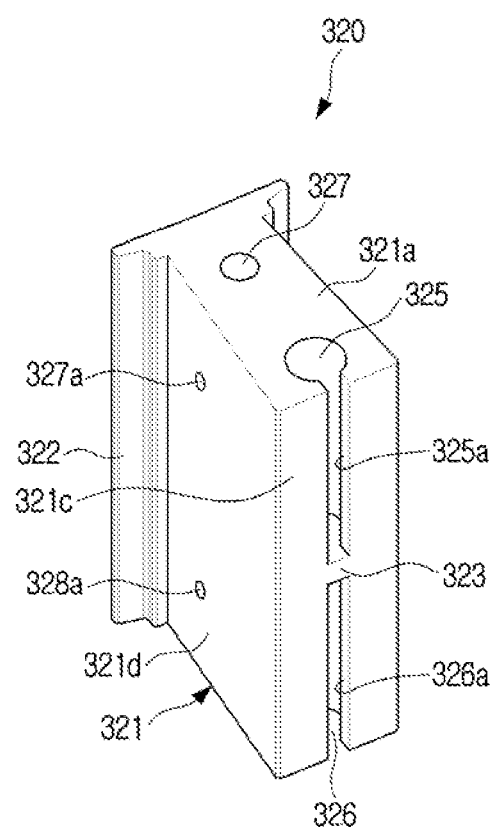
FIG. 8 is a perspective view illustrating a rotor core of a motor according to another embodiment of the disclosure.

The structure of the rotor core 320 illustrated in FIG. 8 is mostly similar to the structure of the rotor core 220 illustrated in FIG. 6 and FIG. 7. Hereinafter, in describing the structure of the rotor core 320, explanation will be omitted regarding the same components as those of the aforementioned rotor core 220.

The rotor core 320 is different in that the thickness of the first partition 323 is formed to be thinner than the thickness of the first partition 223 of the rotor core 220.

In this case, in the rotor core 320, the thickness of the second partition between the third filling groove 327 and the fourth filling groove may be formed to be thicker than the thickness T2 of the second partition 224 of the aforementioned rotor core 220, so that the volume of the rotor core 320 can be maintained to be the same as or similar to the volume of the aforementioned rotor core 220.

In FIG. 8, the reference numeral 321 that is not explained refers to the body, 321a refers to the upper surface of the body, 321c refers to the rear surface of the body, 321d refers to one side surface of the body, 322 refers to the tooth, 325 refers to the first filling groove, 325a refers to the first slit, 236 refers to the second filling groove, 326a refers to the second slit, and 327a and 328a refer to the resin introducing holes.

Figure 9:
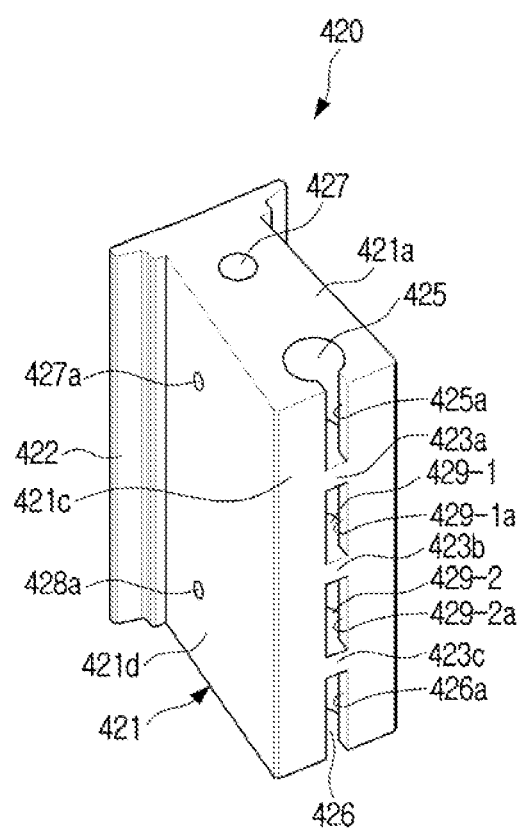
FIG. 9 is a perspective view illustrating a rotor core of a motor according to still another embodiment of the disclosure.

The structure of the rotor core 420 illustrated in FIG. 9 is mostly similar to the structure of the rotor core 220 illustrated in FIG. 6 and FIG. 7. Hereinafter, in describing the structure of the rotor core 420, explanation will be omitted regarding the same components as those of the aforementioned rotor core 220.

The rotor core 420 is different in that a plurality of first partitions 423a, 423b, 423c are provided, and their thicknesses are formed to be thinner than the thickness of the first partition 223 of the aforementioned rotor core 220.

As a plurality of first partitions 423a, 423b, 423c are provided, a plurality of spaces 429-1, 429-2 wherein a resin can be filled may be provided among the first partitions 423a, 423b, 423c. Also, the insides of the plurality of spaces 429-1, 429-2 are opened to the rear surface 421c of the body 421 respectively by the third and fourth slits 429-1a, 429-2a.

Accordingly, in the rotor core 420, spaces wherein a resin can be filled may be increased than the aforementioned rotor cores 220, 320, and thus its coupling force with the frame 210 may be further improved.

In FIG. 9, it is illustrated that there are three partitions 423a, 423b, 423c, but the disclosure is not limited thereto, and it is possible that four or more partitions are formed at specific intervals. Also, the thicknesses of the partitions may be formed to be thicker or thinner than those of the partitions 423a, 423b, 423c.

In FIG. 9, the reference numeral 421a that is not explained refers to the upper surface of the body, 421d refers to one side surface of the body, 422 refers to the tooth, 425 refers to the first filling groove, 425a refers to the first slit, 426 refers to the second filling groove, 426a refers to the second slit, 427 refers to a third filling groove and 427a and 428a refer to the resin introducing holes.

Figure 10A:
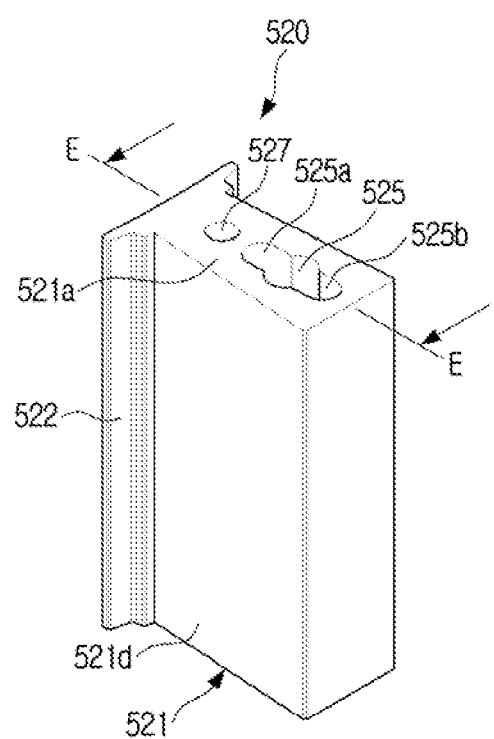
FIG. 10A is a perspective view illustrating a rotor core of a motor according to still another embodiment of the disclosure.
Figure 10B:
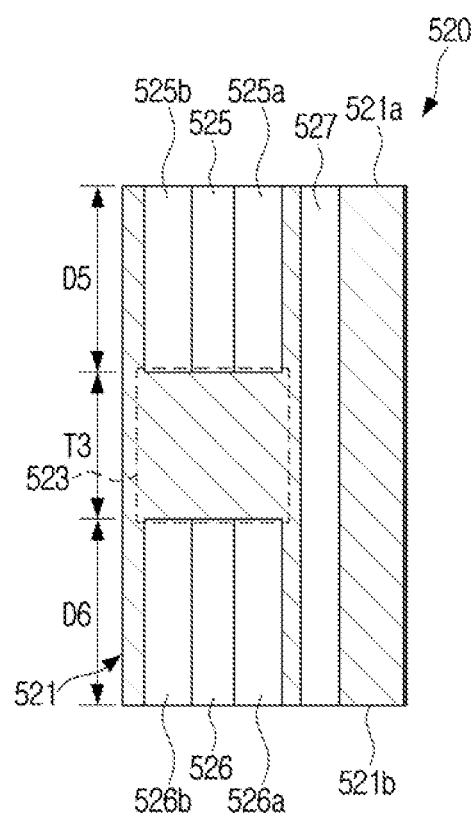
FIG. 10B is a cross-sectional diagram illustrated along the E-E line illustrated in FIG. 10A.

The exterior of the rotor core 520 illustrated in FIG. 10A and FIG. 10B may be formed to be the same as the exterior of the aforementioned rotor core 220, but the shapes of the first and second filling grooves 525, 526 provided on the body 521 may be formed to be rather different from those of the first and second filling grooves 225, 226 of the aforementioned core 220.

Specifically, in the rotor core 520, the first and second filling grooves 525, 526 are arranged to be distanced by a distance corresponding to the thickness T3 of the first partition 523 by the first partition 523. The first filling groove 525 may be formed symmetrically with the second filling groove 526 with the first partition as the center.

The first and second filling grooves 525, 526 are formed to have specific lengths along a virtual straight line that passes the front end part and the rear end part of the body 521.

Both end parts 525a, 525b of the first filling groove 525 may be formed in narrower widths than the width of the center part. During injection molding of the frame 210, if the support pins of the mold are inserted into the center part of the first filling groove 525, both end parts 525a, 525b of the first filling groove 525 may be opened so that a resin can be filled.

The shape of the second filling groove 526 may be formed to be the same as the shape of the aforementioned first filling groove 525. That is, both end parts 526a, 526b of the second filling groove 526 may be formed in narrower widths than the width of the center part. During injection molding of the frame 210, if the support pins of the mold are inserted into the center part of the second filling groove 526, both end parts 526a, 526b of the second filling groove 526 may be opened so that a resin can be filled.

The thickness T3 of the first partition 523 may be formed to be bigger than the first and second depths D5, D6 of the first and second filling grooves 525, 526. For example, it is preferable that the thickness T3 of the first partition 523 is formed to be bigger than approximately (D5+D6)/2.

In the rotor core 520, a penetration hole 527 penetrating from the upper surface 521a to the lower surface 521b of the body 521 may be provided. As a structure wherein, if a resin is filled into the penetration hole 527, a part of the frame 210 penetrates the rotor core and is coupled is formed, the coupling force between the rotor core 520 and the frame 210 may be further improved compared to the aforementioned rotor core 220. In this case, on the body 521, there is no need to form a separate resin introducing hole for introducing a resin into the penetration hole 527 on one side surface 521d.

In FIG. 10A, the reference numeral 522 that is not explained refers to the tooth.

Figure 11A:
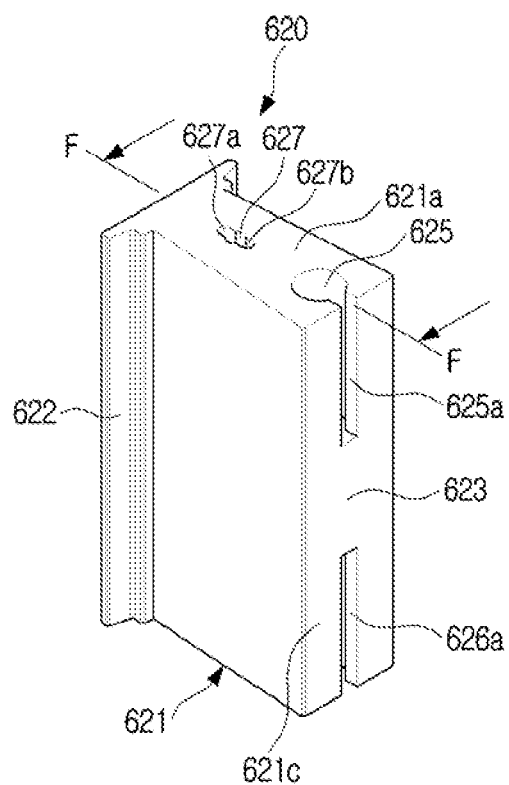
FIG. 11A is a perspective view illustrating a rotor core of a motor according to still another embodiment of the disclosure.
Figure 11B:
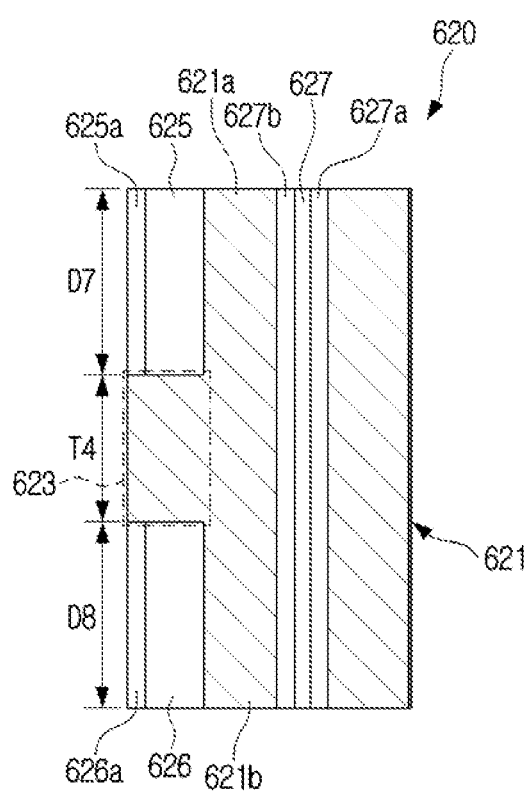
FIG. 11B is a cross-sectional diagram illustrated along the F-F line illustrated in FIG. 11A.

The structure of the rotor core 620 illustrated in FIG. 11A and FIG. 11B is mostly similar to the structure of the rotor core 220 illustrated in FIG. 6 and FIG. 7. Hereinafter, in describing the structure of the rotor core 620, explanation will be omitted regarding the same components as those of the aforementioned rotor core 220.

In the rotor core 620, a penetration hole 627 corresponding to the two third and fourth filling grooves 227, 228 that are arranged to be distant from each other may be formed.

As the penetration hole 627 is formed to penetrate from the upper surface 621a to the lower surface 621b of the body 621, a structure wherein, if a resin is filled into the penetration hole 627, a part of the frame 210 penetrates the rotor core 620 and is coupled is formed, and thus the coupling force between the rotor core 620 and the frame 210 may be further improved compared to the aforementioned rotor core 220.

Both end parts 627a, 627b of the penetration hole 627 may be formed in narrower widths than the width of the center part. During injection molding of the frame 210, if the support pins of the mold are inserted into the center part of the penetration hole 627, both end parts 627a, 627b of the penetration hole 627 are opened. Accordingly, a resin may be filled into the inside of the penetration hole 627 through both end parts 627a, 627b of the penetration hole 627.

In FIG. 11A, the reference numeral 622 that is not explained refers to the tooth, 621c refers to rear surface of body 621, and 623 refers to the first partition, and in FIG. 11B, the reference numeral 625 that is not explained refers to the first filling groove, 625a refers to the first slit, 626 refers to the second filling groove, 626a refers to the second slit, T4 refers to the thickness of the first partition, D7 refers to the depth of the first filling groove, and D8 refers to the depth of the second filling groove.

Figure 12:
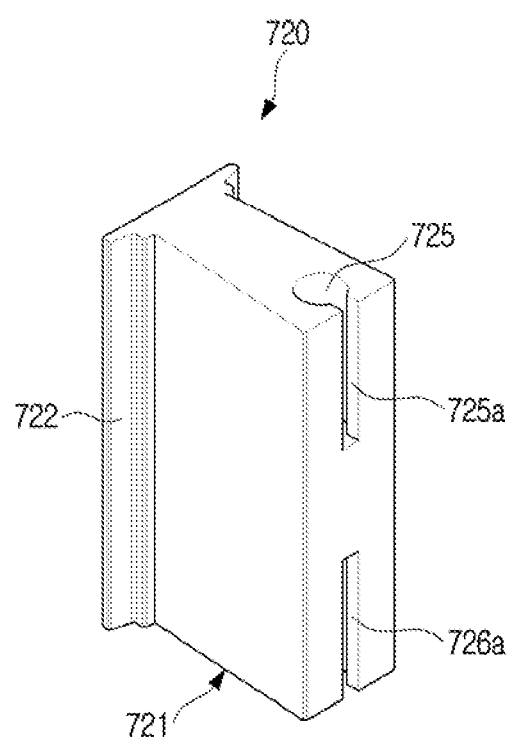
FIG. 12 is a perspective view illustrating a rotor core of a motor according to still another embodiment of the disclosure.

The structure of the rotor core 720 illustrated in FIG. 12 is mostly similar to the structure of the rotor core 220 illustrated in FIG. 6 and FIG. 7. Hereinafter, in describing the structure of the rotor core 720, explanation will be omitted regarding the same components as those of the aforementioned rotor core 220.

In the rotor core 720, additional filling grooves or penetration hole wherein a resin can be filled may be omitted other than the first filling groove 725 and the second filling groove. In this case, reduction of the volume of the rotor core 720 can be minimized compared to the aforementioned rotor core 220, and thus an effect of increasing the use amount of the magnets can be maximized.

In FIG. 12, the reference numeral 722 that is not explained refers to the tooth, 721 refers to the body, 725a refers to the first slit, and 726a refers to the second slit.

Figure 13A:
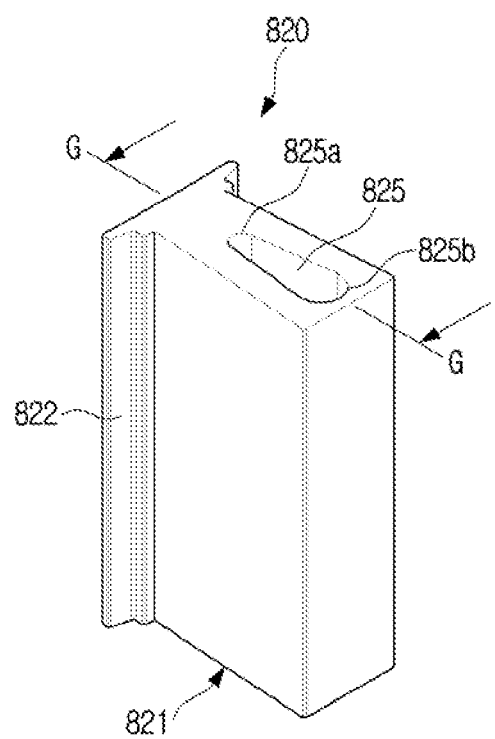
FIG. 13A is a perspective view illustrating a rotor core of a motor according to still another embodiment of the disclosure.
Figure 13B:
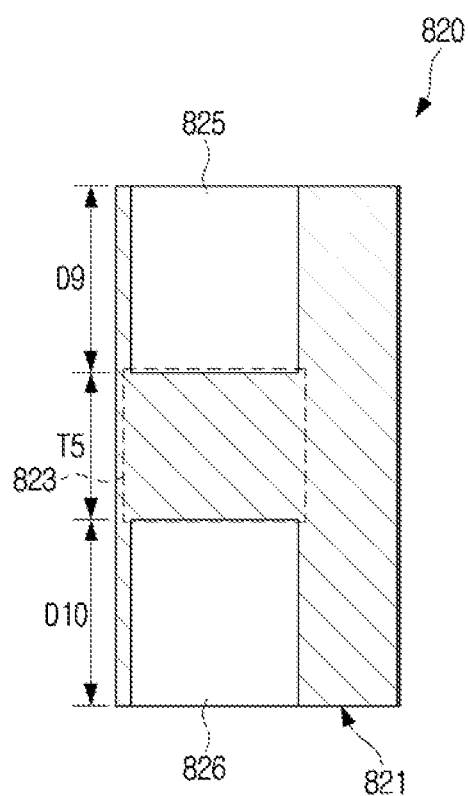
FIG. 13B is a cross-sectional diagram illustrated along the G-G line illustrated in FIG. 13A.

The exterior of the rotor core 820 illustrated in FIG. 13A and FIG. 13B may be formed to be the same as the exterior of the aforementioned rotor core 220, but the shapes of the first and second filling grooves 825, 826 provided on the body 821 may be formed to be rather different from those of the first and second filling grooves 225, 226 of the aforementioned core 220. In FIG. 13B the reference numeral 823 refers to the first partition.

The first and second filling grooves 825, 826 are formed to have specific lengths along a virtual straight line that passes the front end part and the rear end part of the body 821.

In this case, both end parts 825a, 825b of the first filling groove 825 may be formed asymmetrically. For example, the width of the first filling groove 825 may be formed to become gradually narrower from a side adjacent to the rear surface of the body 821 to a side adjacent to the front end part of the body 821. The second filling groove 826 may be formed symmetrically with the first filling groove 825.

In the rotor core 820, additional filling grooves or penetration hole wherein a resin can be filled may be omitted other than the first and second filling grooves 825, 826. In this case, reduction of the volume of the rotor core 820 can be minimized compared to the aforementioned rotor core 220, and thus an effect of increasing the use amount of the magnets can be maximized.

In FIG. 13A, the reference numeral 822 that is not explained refers to the tooth, T5 refers to the thickness of the first partition, D9 refers to the depth of the first filling groove, and D10 refers to the depth of the second filling groove.

Figure 14:
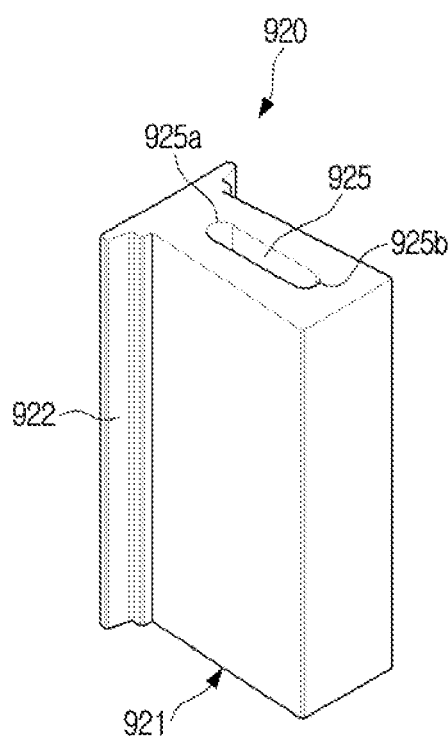
FIG. 14 is a perspective view illustrating a rotor core of a motor according to still another embodiment of the disclosure.

The structure of the rotor core 920 illustrated in FIG. 14 is formed to be mostly similar to the structure of the aforementioned rotor core 820. However, the shapes of the first filling groove 925 and the second filling groove of the rotor core 920 may be formed to be rather different from those of the first filling groove 825 and the second filling groove 826 of the aforementioned rotor core 820.

For example, both end parts 925a, 925b of the first filling groove 925 may be formed symmetrically. Likewise, both end parts of the second filling groove may also be formed symmetrically.

In the rotor core 920, additional filling grooves or a penetration hole wherein a resin can be filled may be omitted other than the first and second filling grooves. Accordingly, reduction of the volume of the rotor core 920 can be minimized compared to the aforementioned rotor core 220, and thus an effect of increasing the use amount of the magnets can be maximized.

In FIG. 14, the reference numeral 922 that is not explained refers to the tooth, and 921 refers to the body.

The descriptions above are merely exemplary explanation of the technical idea of the disclosure, and various amendments, modifications, and substitutions may be made by those having ordinary skill in the technical field to which the disclosure belongs, within the scope of the intrinsic characteristics of the disclosure. Accordingly, the embodiments described above and the accompanying drawings are not for limiting the technical idea of the disclosure, but for explaining the technical idea, and the scope of the technical idea of the disclosure is not limited by the embodiments and the accompanying drawings. Also, the scope of protection of the disclosure should be interpreted based on the appended claims, and all technical ideas within an equivalent scope thereto should be interpreted to belong to the scope of protection of the disclosure.

What is claimed is:

1. A washing machine comprising:
a cabinet;
a tub inside the cabinet;
a drum configured to be rotatable inside the tub; and
a motor including a stator on a rear wall of the tub, and
a rotor configured to rotate by electromagnetically interacting with the stator,
the rotor including a plurality of rotor cores and a plurality of magnets arranged alternately and radially with the plurality of rotor cores, each of the plurality of rotor cores having a body including:
a tooth formed at a front part of the body,
a first groove formed at an upper part of the body,
a second groove formed at a lower part of the body,
a plurality of partitions separating the first groove from the second groove,
a third groove in the upper part of the body,
a fourth groove in the lower part of the body, and
another partition of the plurality partitions in the body between the third groove and the fourth groove,
wherein each of the third groove and the fourth groove is connected to a corresponding one of resin introducing holes on a side surface of the body facing a magnet of the plurality of magnets.

2. The washing machine of claim 1,
wherein a thickness of a partition of the plurality of partitions extending in a longitudinal direction of the body, is different from depths of the first groove and the second groove.

3. The washing machine of claim 1,
wherein the plurality of partitions are spaced at intervals.

4. The washing machine of claim 3, further comprising:
resin introducing spaces opened toward the front part of the body.

5. The washing machine of claim 1,
wherein the first groove and the second groove are symmetrical with each other.

6. The washing machine of claim 5,
wherein each of the first groove and the second groove has a front end and a rear end which are symmetrical.

7. The washing machine of claim 6,
wherein the first groove and the second groove have center portions which are different from widths of the front end and the rear end.

8. The washing machine of claim 6,
wherein the first groove and the second groove have widths which are the same along a longitudinal direction.

9. The washing machine of claim 5,
wherein a front end and a rear end of the first groove and the second groove are asymmetric.

10. The washing machine of claim 1,
wherein the first groove or the second groove includes a slit on a rear end of the body.

11. The washing machine of claim 1, further comprising:
a penetration hole formed to extend from the upper part of the body to the lower part of the body.

12. The washing machine of claim 1,
wherein the third groove and the fourth groove are symmetrical.

13. The washing machine of claim 1, wherein
the rotor includes a frame having an inner circumferential surface to which the plurality of magnets and the plurality of rotor cores are fixed, and
the frame is integrally formed with a serration to which the plurality of magnets, the plurality of rotor cores, and a driving axis are couplable.

14. The washing machine of claim 13,
wherein the frame includes a part extending into the first groove or the second groove of each of the plurality of rotor cores.

15. The washing machine of claim 1,
wherein the stator includes a stator core having a plurality of teeth on an outer circumference, and an aluminum coil wound around the plurality of teeth.

16. A motor comprising:
a stator; and
a rotor configured to rotate by electromagnetically interacting with the stator, the rotor including:
a plurality of rotor cores and a plurality of magnets arranged alternately and radially with the plurality of rotor cores,
a serration configured to be coupled to a driving axis, and
a circular frame injection molded with the plurality of rotor cores, the plurality of magnets, and the serration,
each of the plurality of rotor cores including a body having:
a tooth formed at a front part of the body,
a first groove formed at an upper part of the body,
a second groove formed at a lower part of the body wherein resin is introduced to the first groove and second groove during injection molding,
a plurality of partitions between the first groove and second groove,
a third groove in the upper part of the body,
a fourth groove in the lower part of the body, and
another partition of the plurality of partitions between the third groove and the fourth groove,
wherein each of the third groove and the fourth groove is connected to a corresponding one of resin introducing holes on a side surface of the body facing a magnet of the plurality of magnets.

17. The motor of claim 16,
wherein a thickness of a partition of the plurality of partitions along a longitudinal direction of the body is different from depths of the first groove and the second groove.

* * * * *